United States Patent
Anttila

(10) Patent No.: US 9,384,593 B2
(45) Date of Patent: Jul. 5, 2016

(54) LEVEL OF DETAIL PROCESSING

(75) Inventor: Mika Anttila, Helsinki (FI)

(73) Assignee: VISUAL COMPONENTS OY, Espoo (FI)

( * ) Notice: Subject to any disclaimer, the term of this patent is extended or adjusted under 35 U.S.C. 154(b) by 440 days.

(21) Appl. No.: 13/516,316

(22) PCT Filed: Dec. 15, 2010

(86) PCT No.: PCT/FI2010/051033
§ 371 (c)(1),
(2), (4) Date: Aug. 20, 2012

(87) PCT Pub. No.: WO2011/073518
PCT Pub. Date: Jun. 23, 2011

(65) Prior Publication Data
US 2012/0313939 A1   Dec. 13, 2012

(30) Foreign Application Priority Data
Dec. 18, 2009 (FI) ...................................... 20096354

(51) Int. Cl.
*G06T 17/00* (2006.01)
*G06T 19/00* (2011.01)
*G06T 1/00* (2006.01)
*G06T 9/00* (2006.01)

(52) U.S. Cl.
CPC . *G06T 19/00* (2013.01); *G06T 1/00* (2013.01); *G06T 9/00* (2013.01); *G06T 2210/36* (2013.01)

(58) Field of Classification Search
None
See application file for complete search history.

(56) References Cited

U.S. PATENT DOCUMENTS

| 5,825,998 | A | | 10/1998 | Brechner | |
|---|---|---|---|---|---|
| 5,894,308 | A | * | 4/1999 | Isaacs | G06T 17/20 345/420 |
| 6,100,898 | A | * | 8/2000 | Malamy | G06T 15/04 345/428 |
| 6,313,838 | B1 | * | 11/2001 | Deering | 345/420 |
| 6,400,372 | B1 | * | 6/2002 | Gossweiler, III | G06T 17/00 345/428 |
| 7,551,188 | B2 | * | 6/2009 | Ahokas | 345/684 |
| 8,281,281 | B1 | * | 10/2012 | Smyrl et al. | 717/105 |
| 2002/0030677 | A1 | * | 3/2002 | Huang et al. | 345/420 |
| 2003/0046617 | A1 | * | 3/2003 | MacPherson | 714/48 |
| 2005/0012742 | A1 | * | 1/2005 | Royan | 345/419 |
| 2005/0116949 | A1 | * | 6/2005 | Hoppe | 345/423 |
| 2008/0068380 | A1 | * | 3/2008 | McAvoy et al. | 345/428 |
| 2009/0195541 | A1 | | 8/2009 | Peng et al. | |

FOREIGN PATENT DOCUMENTS

WO      2008066304 A1    6/2008

OTHER PUBLICATIONS

Erikson et al., HLODs for Faster Display of Large Static and Dynamic Environments, 2001, ACM, pp. 111-121.*

(Continued)

*Primary Examiner* — Anh-Tuan V Nguyen
(74) *Attorney, Agent, or Firm* — Hauptman Ham, LLP

(57) ABSTRACT

A method for the level of detail processing in the visualization of virtual models. In the method, the patches for each object are sorted according to the visualization error for producing the fine detail level of the model. When more than one geometry level is used, reduced detail levels are formed so that the patches are in the same order as in the fine detail level. When visualizing the model, a sliding window is placed on the model according to a determined quality factor. The sliding window is positioned on the levels so that it can be partially on two different levels.

11 Claims, 4 Drawing Sheets

(56) References Cited

OTHER PUBLICATIONS

International Search Report for PCT/FI2010/051033, dated Mar. 30, 2011.
Turchyn, P.: "Adaptive meshes in computer graphics and model-based simulation", JyvskylStudies in Computing 71, 2006 [ 24. 3. 2011] Retrieved from the Internet <URL.://https://jyx.jyu .fi/dspace/bitstream/handle/123456789/13269/9513927172.pdf?sequence=1> sections 1.1.1, 1.1.3, 1.1.4, Fig. 2 (Dec. 28, 2006).
Ripolles, 0. E.: "Towards a multiresolution model on GPU", Universitat Jaume I, PhD dissertation Sep. 2009 [ 24. 3. 2011] Retrieved from the Internet <URL//http://www.tesisenxam .net/TESIS_UJ 1/AVA LABLE/ TDX-0322 110-121 325//ripolles. pdf> sections 3.2, 5.2.1-5.2.3, Figs. 3.1, 3.2, 3.4 (Sep. 2009).
Ciampalini, A. et al. "Multiresolution decimation based on global error", The Visual Computer, vol. 13. No. 5, pp. 228-246, 1997 [retrieved 28. 3. 2011] Retrieved from the Internet http://www.springerlink.com/content/r0q4d3q7yd7kuab0/, the whole document.
Schroeder, W. J.: "A topology modifying progressive decimation algorithm", in Proc. 8th conf. on Visualization (VIS97), pp. 205-212, 1997 [retrieved Mar. 28, 2011] Retrieved from the Internet http://portal.acm.org/citation .cfm?id=267059.

* cited by examiner

LEVEL OF DETAIL PROCESSING

RELATED APPLICATIONS

The present application is a National Phase of International Application Number PCT/FI2010/051033, filed Dec. 15, 2010, and claims priority from Finland Application Number 20096354, filed Dec. 18, 2009.

FIELD OF THE INVENTION

The invention relates to computer graphics. Particularly, the invention relates to a method for the level of detail processing in the visualization of virtual models.

BACKGROUND OF THE INVENTION

Visualizing three-dimensional models is computationally a difficult task. Therefore, many different methods have been developed in order to speed up the visualization. Increased computing power and new software implemented methods have made the visualization step considerably faster. However, the increase of speed is typically used for rendering even more complex models. Today, models can include many objects and one complex object can consist of millions of polygons. Thus, the total number of polygons can be extremely large.

In three-dimensional models there are always polygons that are not visible. Typically, these polygons are not rendered at all. In larger models, sometimes very detailed objects are so far away that they are rendered small and all of the details are not visible. For example, the number of pixels in the end-result is considerably smaller than the number of polygons. In those cases it would be advisable to reduce the complexity of the object before visualization. In addition to distance there might be various other reasons, such as the speed of the object, that reduce the need for the large number of polygons. This concept is called the level of detail processing and the general concept is very well known to a person skilled in the art. The problem involved with the level of detail processing is how to choose the level of detail parameters so that the end result is as fast as possible without losing the quality of the visualized image when a very large number of polygons in a complex model is involved. A particularly difficult task is how to choose the details of the object that need to be rendered. The need for details depends on various matters as discussed above. Thus, it is normal that in complex models there are objects that have different needs. The present methods for choosing the details do not meet these requirements very well. Thus, there is a need for new methods for improving the level of detail concept.

SUMMARY

The invention discloses an advanced method for level of detail processing. In the method it is possible to choose the level of detail for each object to be rendered so that the complexity of the object is reduced as much as possible so that the viewer will not notice the reduction of quality in the visualized model or at least the reduction of quality can be maintained at an acceptable level that is determined by the user of the method.

The method according to the invention is based on an arrangement wherein patches of an object to be rendered are ordered according to the visualization error and arranged in levels. Typically, there are three different levels but the invention is not limited to three levels and works with any number of levels including only one level.

The levels are arranged so that the fine detail level includes all details that are rendered when the best quality is desired. The next reduced geometry levels are sequentially coarser so that the last level contains the least details. In all of the levels the patches are arranged in the same order. If the coarser representation means that some of the patches are not rendered at all, those patches are not removed from the level but are marked as terminated and maintained in their places with indication that they are not rendered at all.

When the determined number of levels is more than one, the levels are arranged so that a sliding window can be used for choosing the patches to be rendered. In other words, this means that some of the patches can be chosen from a more fine detailed level and some of the patches from a coarse level. For example, if the object consists of five patches, the best quality is achieved by placing the sliding window completely on the fine detailed level. If the quality needs to be reduced, the sliding window can be placed, for example, so that patches 2-5 are taken from the fine detailed level and patch number 1 is taken from the coarser middle level. If the levels are arranged so that the finest details are considered to be on the left and the coarser levels on the right, the sliding window is moved one step to the right in this example.

The virtual model according to the above is visualized so that, first, the location of the sliding window is determined based on the need of details for the object to be rendered. When the quality factor is determined and the sliding window is moved accordingly, the set of patches within the window is rendered. This provides a computationally easy selection for retrieving the actual polygons needed for visualization of the object with the chosen quality factor.

In an embodiment of the invention sliding window collapsing enables displaying the lightest possible model when geometry would be very small in the screen. Collapsing sliding window starts when window reaches the lightest representation end and then the left window limit is moved towards right using patch steps. Collapsing sliding window requires geometry patches to be organized using both geometry error and geometry size. Geometry size is important as when sliding window is collapsed, then biggest geometry patches still represent well geometry overall appearance.

The benefit of the invention is that it provides an efficient way of using the level of detail processing. Using conventional methods with the same visual quality requirement is many magnitudes slower and thus the invention provides significant benefits in the speed. This leads to faster rendering times and/or to the possibility to use more fine detailed objects. A further benefit of the invention is that it is compatible with other methods for improving the speed of rendering.

The benefits of the present invention include low overhead to preprocess geometry into the sliding window patch format using current tools (CAD tessellation or polygon decimation), low memory footprint when compared to the standard representation, and excellent visual quality as the level of detail is fully dynamically controlled without causing any disturbing visual artifacts. Furthermore, the invention supports any graphics pipeline primitives and can be used together with other optimizations (such as tri-strips, cache optimizations etc.) The present invention is hardware friendly and can utilize all hardware acceleration features.

Furthermore, a benefit of the invention is that it can be instanced for different quality representations with no overhead to CPU, memory or graphics hardware. The instancing uses many times the same geometry with different location and visual attributes. An additional benefit of the invention is that accessing different geometry levels can be used for any other type of algorithms dealing with 3D geometry (ray tracing, collision checking, etc.)

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
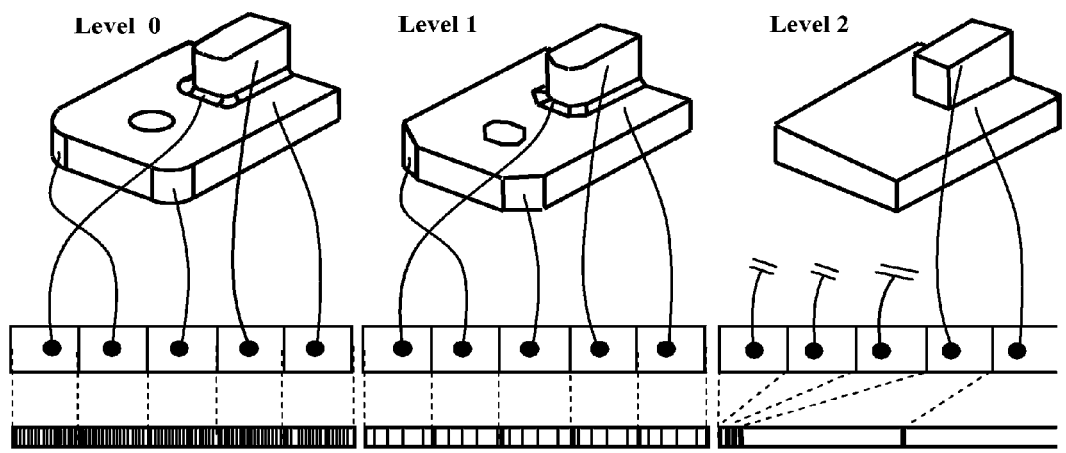
FIG. 1 is an illustration explaining basic principles of the present invention.

First, general concepts of the invention are discussed. In FIG. 1 there is an object containing five patches. A person skilled in the art understands that a patch is a part of the object. One patch includes a number of graphics primitives. For more complex patches, the number can be very large. In FIG. 1, level 0 is disclosed as having the most details. The object of level 0 has nice round corners and fine details. Level 1 is a little bit coarser representation of the object. Corners are still faceted but not rounded. In level 2, the corners are in the right angle. It can be clearly seen that the object of level 0 is more complex than the object of level 2.

FIG. 1 further discloses the structure of the patches. In levels 0 and 1 there are five different patches actually rendered. In level 0, the data of the patches is fine and in level 1 it is coarse. These patches correspond to same parts of the figure. Thus, if you take patch number 0 from both levels they both represent the left front corner of the object. In level 2, the corner is in the right angle and, thus, rounding or faceting is not needed. Thus, that patch is not rendered. This leads to easier rendering. However, the patches of level 2 are also in the same order, so by taking patch number 0 we will get information on how to render the left front corner. In level 2, it is indicated that the corner is not rendered; only the main object to with patch number 0 is applied is rendered.

Figure 2:
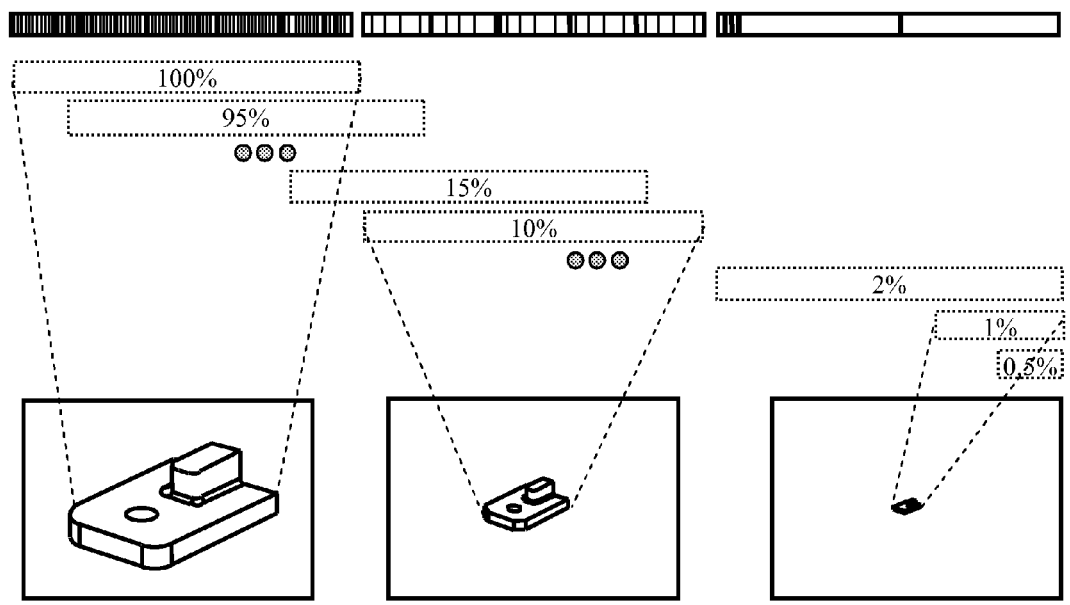
FIG. 2 is an illustration explaining basic principles of the present invention.

As the patches are in the same order, the sliding window can be placed so that some of the patches can be chosen from the more fine detailed level and some of the patches from the coarse level. For example, if the object consists of five patches, the best quality is achieved by placing the sliding window completely on the fine detailed level. If the quality needs to be reduced, the sliding window can be placed, for example, so that patches 2-5 are taken from the fine detailed level and patch number 1 is taken from the coarser middle level. If the levels are arranged so that the finest details are considered to be on the left and the coarser levels on the right, the sliding window is moved one step to the right in this example. In FIG. 2, this is illustrated by using the quality factor of 100%. As can be seen from the figure, the quality factor of 95% moves the sliding window one step to the right. This is naturally only a simplified example. In real applications, the objects may contain any number of patches, and the 5% change in quality is not restricted to one patch.

FIG. 1 displays example, how largest geometry blocks are represented last and smaller details first in the sliding window order. This allows collapsing window in the end and still display overall what geometry looks like. In FIG. 2 sliding window collapsing can be seen when third representation is displayed, window is collapsed from left to achieve even lighter representations. The rendering of FIG. 2 uses sliding window to access the desired level representation.

Figure 3:
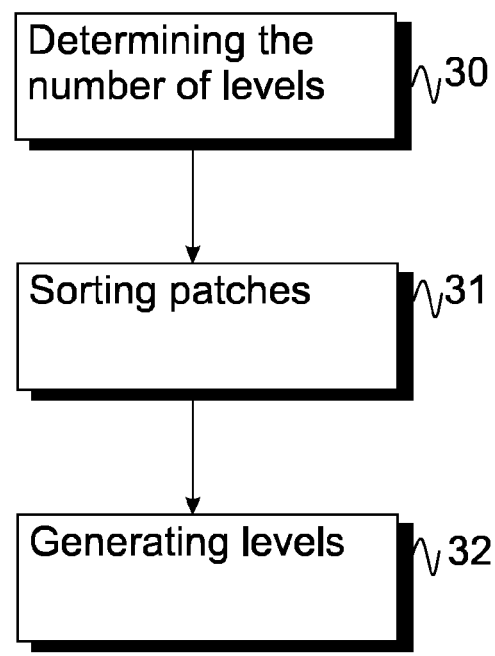
FIG. 3 is a flow chart of a method for generating a virtual model according to the present invention.

FIG. 3 discloses a method according to the invention. In the method, the basic principles disclosed above are applied. The method is always applied to a virtual model, a graphics scene or similar, containing graphics primitives to be rendered. In the first step, the number of levels is determined, step 30. Typically, three levels are chosen because it has proved to be a good choice in the practice. However, the invention is not limited to three levels and any number of levels including only one level can be used.

In step 31, the patches of the fine detailed level are sorted according to the visualization order. The fine detailed level is the model that is acquired from the design software and typically it includes full details, however, it is possible that the designer decides that even the finest detail level does not include all the details that are in the model.

In step 32, the actual levels are made. The first level, which is sorted according to the visualization error as disclosed in step 31, is linked to further levels so that the patches are maintained in the same order. The patches of the further levels do not include as much details as the first level so the rendering process will be lighter. For example, in the example of the three-level configuration, the second level includes less details than the first level but it is considerably better than the third level that is a coarse representation of the model. When the representation gets coarser, all of the patches are not rendered. Those patches are not removed from the representation but are marked as terminated so that they are not rendered. Thus, the first and third levels have the same number of patches. There are several ways for the actual generation of the levels. For example, the design program used for designing the model may be able to produce the levels at the desired quality factor, or decimation algorithms known to a person skilled in the art may be used.

It must be noted that steps 30 and 31 are not in the sequential order but can be executed in any order. Furthermore, a person skilled in the art recognizes that, typically, the model is stored on a computer readable medium, such as a hard drive, DVD, or memory card for later use; however, it is also possible to proceed directly to the visualization from the generation.

Figure 4:
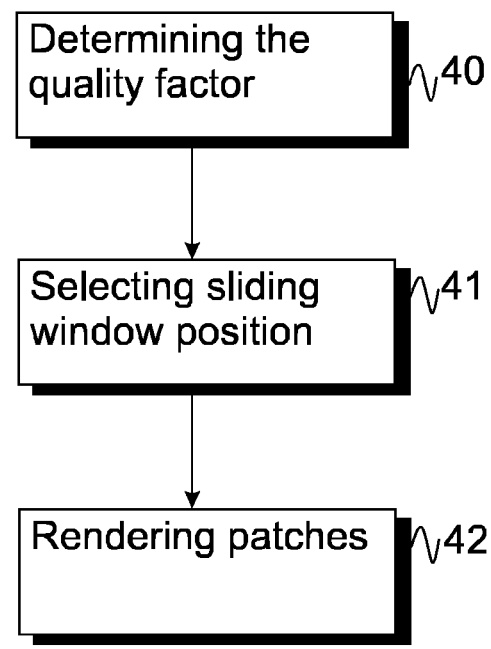
FIG. 4 is a flow chart of a method for visualizing the virtual model generated in FIG. 3 according to the present invention.

In FIG. 4, the visualization process for a model generated according the example of FIG. 3 is disclosed. First, a quality factor must be determined, step 40. In the example, the range for the quality factor is 0-100%. The quality factor is object specific and thus determined for each object in the model.

Next, the sliding window is placed in the right place, step 41. This is done according to the quality factor. The method for placing the window in the right place is discussed above referring to FIG. 2. The best 100% quality means that the window is completely on the first level containing full details. When the best quality is not needed, the window is moved so that it still covers the same number of patches that are included in the first level. In other words, if there are five patches in the first level, most of the time the sliding window covers also five different patches. When the quality requirement is very low, the window can be placed to cover only a portion of the coarsest level.

The method for generating and visualizing a virtual model according to the invention is preferably implemented as a computer program product. The computer program product is arranged on a computer readable medium or it can be implemented as a service. In a preferred embodiment, the method is used by executing the computer program product on a computing device, wherein the computer program product is arranged to store the model to be visualized in the memory of the device and to visualize it by using general purpose processor, graphics processor or other special purpose processor. A video card and display are required for presenting the visualization. A person skilled in the art understands that the computing device according to the invention may include further common components, such as a keyboard, mouse and further common program products.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method for generating a virtual model for at least one object, including processing a level of details, the method comprising:
    determining a number of levels of geometries;
    generating a full detail level of the geometries by sorting patches of each object of a model according to a visualization error for the full detail level, wherein the visualization error comprises geometry error and geometry size;
    when the determined number of levels is more than one, constructing a determined number of reduced geometry levels from a model coordinate data; and
    choosing the patches of each object for rendering according to a sliding window so that none of the patches is rendered more than once, wherein additional levels of the geometries are simplified versions of said full detail level and arranged according to the visualization error of the full detail level in a sorted order to provide a set of levels of the geometries for said sliding window selection.

2. The method according to claim 1, wherein said reduced geometry levels are generated by saving a reduced set of the geometries from a design software.

3. The method according to claim 1, wherein said reduced geometry levels are generated by using a decimation algorithm.

4. The method according to claim 1, wherein completely removed patches are defined as terminated and maintained in their original places in the sorted order.

5. The method according to claim 1, wherein the method further comprises storing said virtual model on a computer readable medium.

6. The method according to claim 1, wherein the number of levels is at least two.

7. A method for visualizing a virtual model generated according to a method according to claim 1, wherein the method for visualizing the virtual model comprises:
    determining a quality factor for the object to be rendered;
    choosing a sliding window location corresponding to said quality factor;
    choosing the patches of the object to be rendered from said sliding window; and
    visualizing said chosen patches.

8. The method according to claim 7, wherein said sliding window is arranged to move continuously from one level to another.

9. A computer program product arranged on a non-transitory computer readable medium for generating a virtual model comprising level of detail processing, wherein the computer program product is arranged to perform the method according to claim 1 when executed on a computing device.

10. A computer program product arranged on a non-transitory computer readable medium for visualizing a virtual model comprising level of detail processing, wherein the computer program product is arranged to perform the method according to claim 7 when executed on a computing device.

11. A computing device, wherein said computing device comprises a processor, a memory, a graphics adapter and a display, arranged to execute on the processor the computer program product according to claim 9 in order to generate a virtual model in the memory or to visualize the virtual model on the display, the virtual model comprising level of detail processing.

* * * * *